US010112586B2

(12) United States Patent
Brooks et al.

(10) Patent No.: US 10,112,586 B2
(45) Date of Patent: Oct. 30, 2018

(54) BRAKE PEDAL INTERFACING WITH HYDROSTATIC DRIVE (71) Applicant: CNH Industrial America LLC, New Holland, PA (US)

(72) Inventors: Nathan Paul Brooks, Manitowoc, WI (US); Kerry J. Treinen, Malone, WI (US)

(73) Assignee: CNH Industrial America LLC, New Holland, PA (US)

( * ) Notice: Subject to any disclaimer, the term of this patent is extended or adjusted under 35 U.S.C. 154(b) by 240 days.

(21) Appl. No.: 15/140,782

(22) Filed: Apr. 28, 2016

(65) Prior Publication Data

US 2016/0318488 A1 Nov. 3, 2016

Related U.S. Application Data (60) Provisional application No. 62/154,419, filed on Apr. 29, 2015.

(51) Int. Cl.
*B60T 7/04* (2006.01)
*B60K 26/02* (2006.01)
(Continued)

(52) U.S. Cl.
CPC .............. *B60T 7/042* (2013.01); *B60K 26/02* (2013.01); *B60T 1/093* (2013.01); *B60T 7/085* (2013.01);
(Continued)

(58) Field of Classification Search
None
See application file for complete search history.

(56) References Cited

U.S. PATENT DOCUMENTS 4,422,693 A  12/1983 Farr
5,029,947 A  7/1991 Knight et al.
(Continued)

FOREIGN PATENT DOCUMENTS

DE   4224857 A1   9/1993

OTHER PUBLICATIONS

Michelle Eauclaire-Kopies; "A brake-through in electrohydraulics" web-site—http://www.oemoffhighway.com/article/10770952/a-brake-through-in-electrohydraulics; Sep. 2012, US.

*Primary Examiner* — John Olszewski
*Assistant Examiner* — Gerrad A Foster
(74) *Attorney, Agent, or Firm* — Rebecca L. Henkel; Rickard K. DeMille (57) ABSTRACT An improved system for braking an agricultural vehicle propelled by a hydrostatic drive unit is disclosed. An operator provides a desired speed command from a first user interface, such as a joystick. The joystick generates a command responsive to the deflection and communicates the command to a controller. The agricultural vehicle also includes a second user interface, such as a brake pedal. The brake pedal includes a transducer configured to generate a signal corresponding to a deflection of the brake pedal which is also communicated to the controller. If the operator presses the brake pedal when the joystick is commanding motion, the controller reduces the signal from the joystick. The amount the signal is reduced increases as the deflection of the brake pedal increases until the brake pedal overrides any speed command from the joystick.

20 Claims, 9 Drawing Sheets (51) Int. Cl.
    *B60T 1/093*    (2006.01)
    *B60T 7/08*     (2006.01)
    *B60T 10/04*    (2006.01)
    *B60T 13/66*    (2006.01)
    *B60T 13/68*    (2006.01)
    *B60T 15/14*    (2006.01)
    *B60K 17/10*        (2006.01)
    *B60K 7/00*         (2006.01)

(52) U.S. Cl.
    CPC ............ *B60T 10/04* (2013.01); *B60T 13/662* (2013.01); *B60T 13/686* (2013.01); *B60T 15/14* (2013.01); *B60K 7/0015* (2013.01); *B60K 17/10* (2013.01); *B60K 2026/029* (2013.01); *B60T 2220/04* (2013.01); *B60T 2260/00* (2013.01); *B60Y 2200/22* (2013.01)

(56) References Cited

U.S. PATENT DOCUMENTS

| | | |
|---|---|---|
| 5,286,094 A | 2/1994 | Milner |
| 5,348,123 A | 9/1994 | Takahashi et al. |
| 5,573,312 A | 11/1996 | Muller et al. |
| 5,842,534 A | 12/1998 | Frank |
| 6,027,177 A | 2/2000 | Ferguson et al. |
| 6,059,383 A * | 5/2000 | Paggi ............ B60T 8/246 303/155 |
| 6,112,826 A | 9/2000 | Ura et al. |
| 6,315,092 B1 | 11/2001 | Schwarz |
| 7,077,221 B2 | 7/2006 | Vuksa et al. |
| 7,318,629 B1 | 1/2008 | Sun et al. |
| 7,540,571 B2 | 6/2009 | Yamaguchi |
| 7,690,737 B2 | 4/2010 | Lu |
| 8,287,055 B2 | 10/2012 | Lee |
| 8,616,659 B2 | 12/2013 | Nordhoff |
| 8,831,851 B2 | 9/2014 | Canuto et al. |
| 8,838,356 B2 | 9/2014 | Mederer et al. |
| 2002/0185914 A1 | 12/2002 | Clay et al. |
| 2010/0032219 A1* | 2/2010 | Udagawa ............ B60K 6/46 180/65.265 |
| 2014/0174067 A1* | 6/2014 | Schulte ............ B60K 41/004 60/327 |
| 2014/0343813 A1 | 11/2014 | Morselli et al. |

\* cited by examiner

BRAKE PEDAL INTERFACING WITH HYDROSTATIC DRIVE

CROSS REFERENCE TO RELATED APPLICATIONS

This application claims priority from U.S. provisional patent application Ser. No. 62/154,419, entitled "Brake Pedal Interfacing With Hydrostatic Drive," filed Apr. 29, 2015, which is incorporated herein by reference.

FIELD OF THE INVENTION

The invention relates generally to agricultural product application equipment such as self-propelled sprayers and, in particular, to an improved braking system for the agricultural product application equipment.

BACKGROUND OF THE INVENTION

Agricultural vehicles are used under a wide range of operating conditions. The vehicles are used outdoors and may be required to traverse a paved road to move from a storage facility to a field and then traverse an unpaved surface getting to and working in the field. Some agricultural vehicles are driven using hydraulic motors. A separate hydraulic motor may be used on each wheel. A hydraulic pump may be located on the vehicle to generate hydrostatic pressure. A hydraulic line connects the hydraulic pump to each hydraulic motor. The amount of hydrostatic pressure generated by the hydraulic pump determines the amount of torque applied to each wheel by the hydraulic motor.

Historically, the hydraulic systems include a user interface, such as a joystick, to receive a speed command from the operator. For example, the operator may push the joystick either forward or reverse to command forward or reverse operation of the agricultural vehicle. The amount of deflection of the joystick from a neutral position corresponds to the speed at which the operator wishes to travel.

Agricultural vehicles are further equipped with service brakes to slow and stop the vehicle. The service brakes use conventional braking components such as brake pads applied to a brake rotor or brake shoes applied to a brake drum. A brake pedal may be pressed by the operator to activate the service brakes.

Under emergent or quick stopping conditions, however, the potential exists for the operator to be commanding motion of the agricultural vehicle via the joystick and be required to quickly activate the service brakes. Under these conditions, the hydraulic system may be driving through the service brakes, causing excessive wear and/or premature failure of the service brakes.

Thus, it would be desirable to provide an improved braking system for an agricultural vehicle propelled by a hydrostatic drive unit.

SUMMARY OF THE INVENTION

The present invention provides an improved braking system for an agricultural vehicle propelled by a hydrostatic drive unit. The agricultural vehicle includes a first user interface, such as a joystick, by which an operator provides a desired speed command. The joystick may be moved forward or reverse to indicate forward or reverse motion and the magnitude of deflection corresponds to a desired rate of speed. The joystick generates a command responsive to the deflection and communicates the command to a controller. The agricultural vehicle also includes a second user interface, such as a brake pedal, by which an operator controls the service brakes on the agricultural vehicle. The brake pedal includes a transducer configured to generate a signal corresponding to a deflection of the brake pedal which is also communicated to the controller. When no signal is present from the brake pedal, the controller generates a signal to the hydrostatic drive unit to control the speed of the agricultural vehicle responsive to the joystick. However, if the operator presses the brake pedal when the joystick is commanding motion, the controller reduces the signal from the joystick. The amount the signal is reduced increases as the deflection of the brake pedal increases until the brake pedal overrides any speed command from the joystick. As a result, operation of the brake pedal prevents the hydrostatic drive from attempting to drive through the service brakes in response to a command from the joystick.

According to one embodiment of the invention, a system for stopping an agricultural vehicle includes a first user interface, a second user interface, and a controller. The first user interface is operable to provide a first command signal corresponding to a desired travelling speed of the agricultural vehicle, and the second user interface is operable to generate a second command signal corresponding to a desired braking of the agricultural vehicle. The controller is configured to receive each of the first and the second command signals and to generate a third command signal to a hydrostatic drive unit for the agricultural vehicle as a function of the first and second command signals. The first user interface may be a joystick, and the first command signal may have a range between zero speed and full speed corresponding to a range of deflection of the joystick. The second user interface may be a brake pedal having a transducer, where the transducer generates the second command signal corresponding to a range of deflection of the brake pedal.

According to another aspect of the invention, the third command signal to the hydrostatic drive unit corresponds to the first command signal when the brake pedal is at a neutral position, and the third command signal to the hydrostatic drive unit is reduced from the first command signal by the second command signal as the brake pedal travels through the range of deflection of the brake pedal. The controller may generate an interlock disabling the hydrostatic drive unit when the first command signal indicates the joystick is not at a neutral position and the second command signal exceeds a predefined threshold. The controller releases the interlock when the first command signal indicates the joystick is at the neutral position.

According to another embodiment of the invention, a system for stopping an agricultural vehicle includes a joystick, a brake pedal, and a controller. The joystick is operable to provide a first command signal corresponding to a desired travelling speed of the agricultural vehicle, and the brake pedal includes a transducer operable to generate a second command signal corresponding to a range of deflection of the brake pedal. The controller is configured to receive each of the first and the second command signals and to generate a third command signal to a hydrostatic drive unit for the agricultural vehicle as a function of the first and second command signals.

According to another aspect of the invention, the system may include a set of service brakes, and the range of deflection of the brake pedal generates a fourth command signal to control operation of the set of service brakes to slow the agricultural vehicle. It is contemplated that the range of deflection of the brake pedal includes a first segment, a second segment, and a third segment. During the first segment, the third command signal may be reduced to a predefined, non-zero level without generating the fourth command signal. During the second segment, the third command signal is reduced to zero and the fourth command signal is generated to a level less than a full braking force. During the third segment, the fourth command signal is increased to the full braking force.

According to still another embodiment of the invention, a method for controlling a speed of travel of an agricultural vehicle is disclosed. The method includes the steps of generating a first command signal with a first user interface, generating a second command signal with a second user interface, and receiving the first command signal and the second command signal at a controller on the agricultural vehicle. The first command signal corresponds to a desired speed of travel of the agricultural vehicle, and the second command signal corresponds to a desired braking of the agricultural vehicle. The controller generates a third command signal responsive to both the first command signal and the second command signal and transmits the third command signal to a hydrostatic drive unit for the agricultural vehicle. The hydrostatic drive unit supplies hydraulic fluid to a plurality of hydraulic motors on the agricultural vehicle responsive to the third command signal, and the plurality of hydraulic motors control the speed of travel of the agricultural vehicle. The first user interface may be a joystick and the first command signal may have a range between zero speed and full speed corresponding to a range of deflection on the joystick. The second user interface may be a brake pedal, and the second command signal may correspond to a range of deflection of the brake pedal.

According to another aspect of the invention, the step of generating a first command signal may initially be performed with the second user interface in a neutral position, indicating no desired braking of the agricultural vehicle. During the initial period of generating the first command signal, the third command signal corresponds to the first command signal. It is further contemplated that each of the hydraulic motors may control operation of one wheel of the agricultural vehicle and that the wheel includes a service brake operable to slow rotation of the wheel.

According to still another aspect of the invention, the step of generating the second command signal includes the steps of moving the brake pedal from the neutral position through the range of deflection of the brake pedal, where the range of deflection includes a first segment, a second segment, and a third segment. During the first segment, the third command signal is reduced to a predefined, non-zero level without generating a fourth command signal to the service brake. During the second segment, the third command signal is reduced to zero and the fourth command signal is increased to a level less than a full braking force. During the third segment, the fourth command signal is increased to the full braking force.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
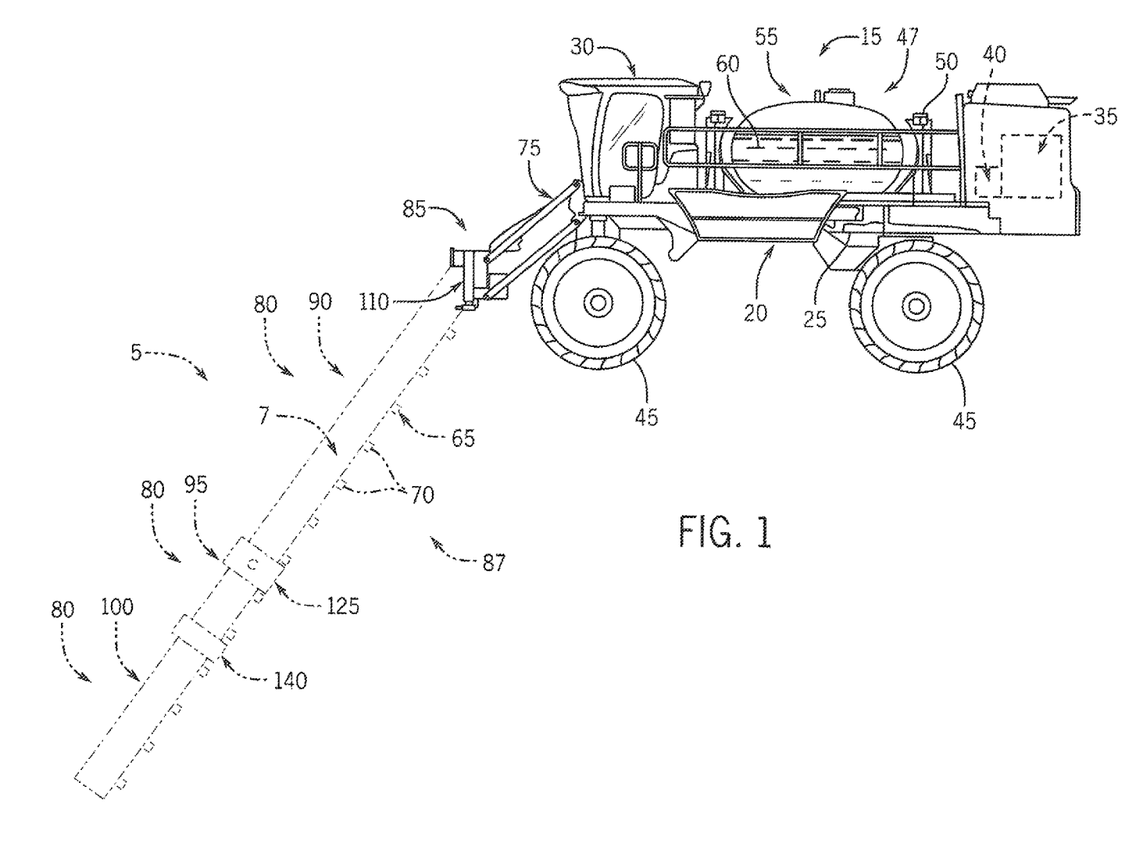
FIG. 1 is a is a side elevation of a self-propelled sprayer with a sprayer boom system with multi-direction section activation control according to one embodiment of the present invention.

Referring now to the drawings and specifically to FIG. 1, a sprayer boom system 5 is provided that includes a boom 7 with multi-direction section activation control is shown for use with an agricultural applicator. The agricultural applicator is a machine that deposits, for example, liquid as well as dry and gaseous product, above and below ground, pre-emerge and post-emergence or sprouting of the crop, which includes operations such as seeding, inter-seeding, fertilizing and application of, for example, herbicides, fungicides, and insecticides as well as soil conditioners, growth retardants, and other agents, such as by way of various toolbar attachments, planters, anhydrous ammonia applicators, and others. The agricultural applicator may be a sprayer 15 and is shown here as a self-propelled agricultural sprayer vehicle or self-propelled sprayer 15. Although the sprayer 15 is shown as a front-mounted boom self-propelled sprayer, it is understood that self-propelled versions of the sprayer 15 can have either front-mounted, mid-mount, or rear-mounted booms, such as those available from CNH Industrial, including the Miller Nitro and Condor Series sprayers and New Holland Guardian Series sprayers, as well as pull-type or towed sprayers, boom-less sprayers, tiered booms, and detachable sprayers.

Figure 2:
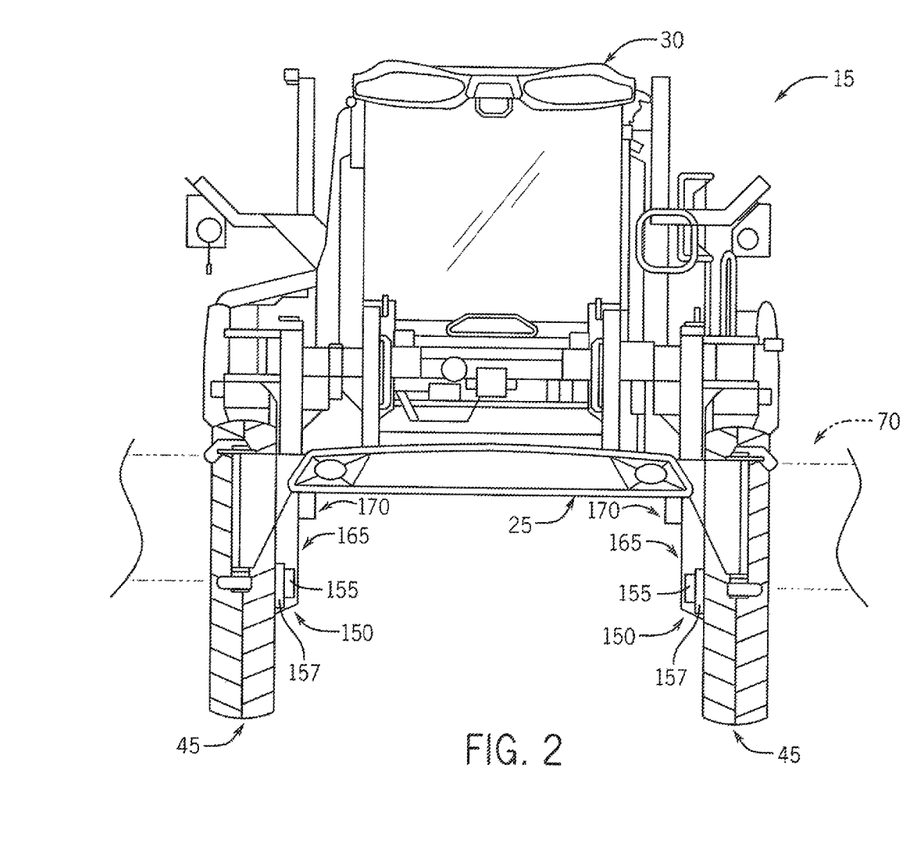
FIG. 2 is a front elevation view of the self-propelled sprayer of FIG. 1.

The sprayer 15 includes a chassis 20 having a chassis frame 25 that supports various assemblies, systems, and components. With reference to FIGS. 1 and 2, these various assemblies, systems, and components include a cab 30 in which the operator may ride, an engine 35, and a hydraulic system 200 (illustrated in FIG. 4). The hydraulic system 200 receives power from the engine 35 and includes a hydraulic pump system 40 which may be in a hydrostatic arrangement for providing hydraulic pressure for operating hydraulic components within the hydraulic system 200. For sprayers with hydrostatic drives 150, hydraulic motors 155 are operably connected to the hydraulic pump(s) for the rotating wheels 45. In mechanical drive applications, a mechanical transmission receives power from the engine 35 and delivers power for the rotating wheels 45 by way of power-transmitting driveline components such as drive shafts, differentials, and other gear sets in portal, drop boxes, or other housings. An application system, shown as a spraying system or spray system 47, includes storage containers such as a rinse tank 50 storing water or a rinsing solution and a product tank 55 that stores a volume of product 60 for delivery onto an agricultural field with the sprayer 15. The product 60 includes any of a variety of agricultural liquid products, such as various pesticides, herbicides, fungicides, liquid fertilizers, and other liquids including liquid suspensions beneficial for application onto agricultural fields. A product delivery pump conveys the product 60 from the product tank 55 through plumbing components such as interconnected pieces of tubing and through a boom tubing system 65 for release out of application or spray nozzles 70 that are spaced from each another along the width of boom 7 during spraying operations. The boom 7 is connected to the chassis 20 with a lift arm assembly 75 that is configured to move the boom 7 up and down for adjusting the height of application of the product 60.

As previously indicated, the hydraulic system 200 receives power from the engine 35. The hydraulic pump system 40 may be driven by a power take-off (PTO) from the engine or from a transmission or other gear assembly connected to the engine 35. With reference also to FIG. 2, each wheel 45 includes a hydrostatic wheel drive 150 operatively connected between the wheel 45 and the hydraulic pump system 40 to propel the wheel 45. At each wheel 45, a leg 165 extends down from a swing arm 170, which is pivotally mounted to the chassis frame 25. The wheel drives 150 are mounted on each leg 165 proximate the center of each wheel 45. Each wheel drive 150 includes a hydraulic motor 155 which may be connected directly to each wheel or, as illustrated, may include a planetary gear set 157 connected between the output of the hydraulic motor 155 and the hub of the wheel 45.

Figure 3:
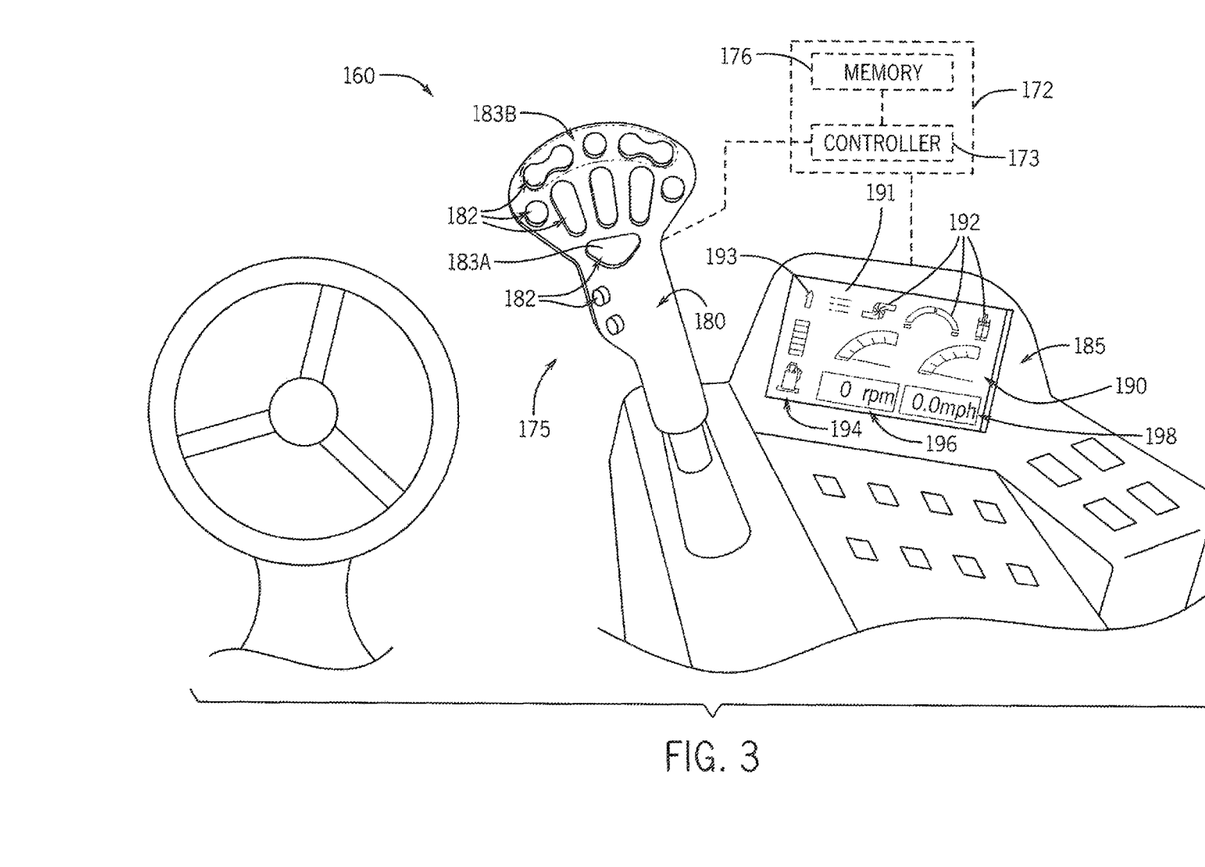
FIG. 3 is a simplified partial schematic pictorial view of a control system incorporated in the sprayer of FIG. 2.

Turning next to FIG. 3, the sprayer includes a control system 160 with multiple user interfaces that allow for operator control of the systems and components of sprayer 15. The user interfaces may include a joystick 175 and a monitor 185 with a touchscreen 190 as a Human Machine Interface (HMI). Although shown as a single HMI, it is understood that multiple HMI's may be implemented such as an in-cab HMI and another at a load station, or a portable HMI via an electronic tablet application program or dedicated HHD (hand held device) either wireless or tethered to control system 160. The operator may additionally provide a field computer (not shown) that may be configured to interface either via a wired or wireless connection with a machine controller 172. The field computer may include software configurable at a remote location, such as an office, to control precision agriculture-type procedures, as well as various components and systems of the sprayer 15 in one or more application locations.

The machine controller 172 includes a microprocessor-based controller 173 mounted on the machine and memory 176 in communication with the microprocessor-based controller 173. The microprocessor-based controller 173 may be implemented as a programmable logic controller (PLC) or other industrial computer, along with corresponding software stored in memory 176. The machine controller 172 may further include hardware such as inputs and outputs for receiving signals from and providing signals to sensors, actuators, or other electro-mechanical or hydraulic components of the sprayer 15 along with interconnecting conductors between the controller 173 and the controlled devices.

The joystick 175 includes a grip 180 with various grip buttons 182 for controlling corresponding functions of the sprayer 15 including movement characteristics such as range and speed controls, as well as functions of the boom position control and spray section control systems. According to the illustrated embodiment, the grip buttons 182 include a master button 183A that turns on or activates all the spray sections 72 when pressed once and when pressed again will shut off or deactivate all the spray sections 72. The grip spray control buttons 183B are configured for indexing and controlling the deactivation and activation of the spray sections 72.

The touchscreen 190 may also have buttons displayed as icons or graphical buttons 192 that may be selected to also control the deactivation and activation of the spray sections 72. Thus, an operator may implement various requests through the field computer, joystick 175, touchscreen 190 or a combination thereof for controlling functions of the sprayer 15. The monitor 185 may also display status and operating parameters of the sprayer 15 such as fuel level 194, engine revolutions per minute 196, and vehicle speed 198. The status items and operating parameters displayed may vary based on the selections from a menu 191. A home icon 193 may be pressed to return the display 185 to a predefined "home" screen.

Figure 4:
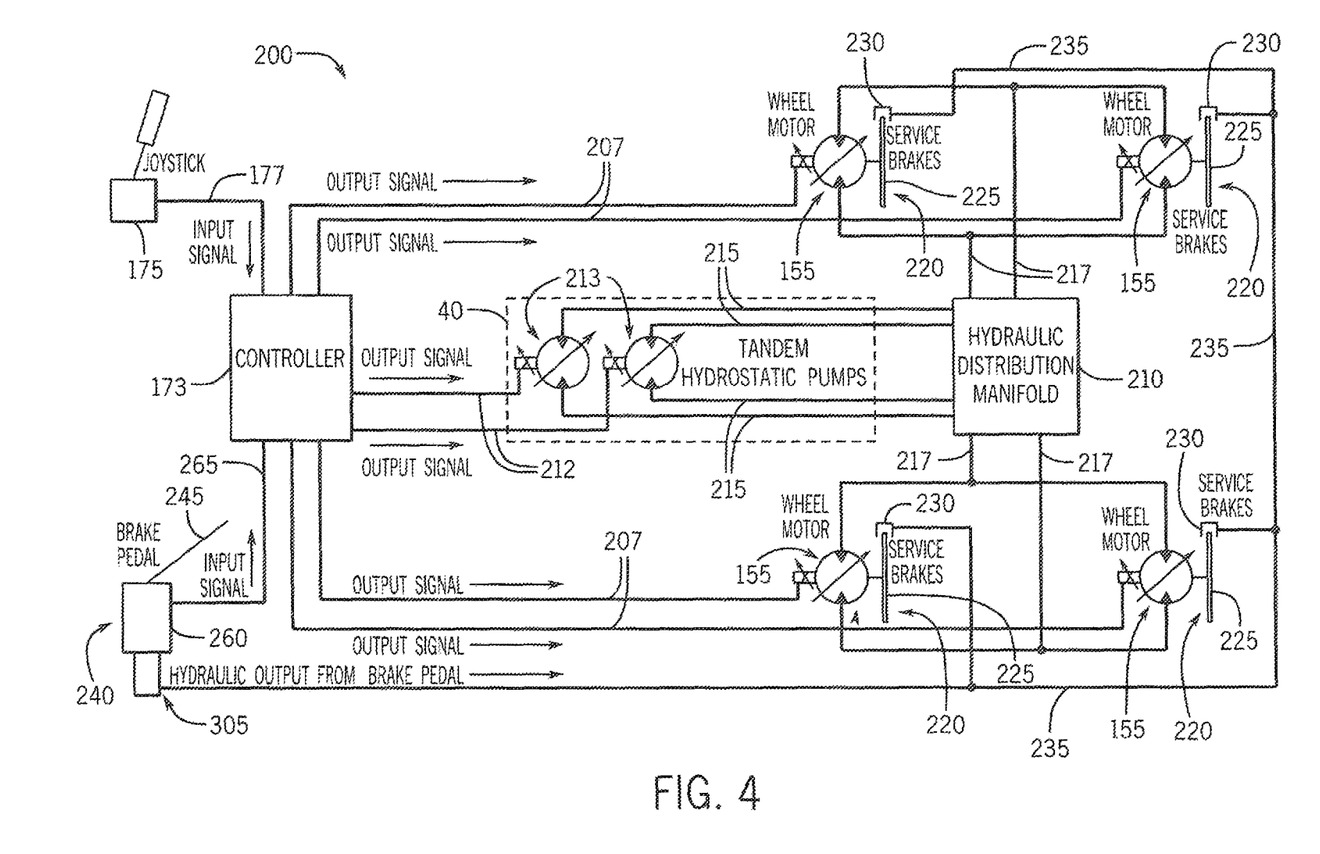
FIG. 4 is a partial schematic diagram illustrating control of one embodiment of the hydraulic system on the self-propelled sprayer.
Figure 5:
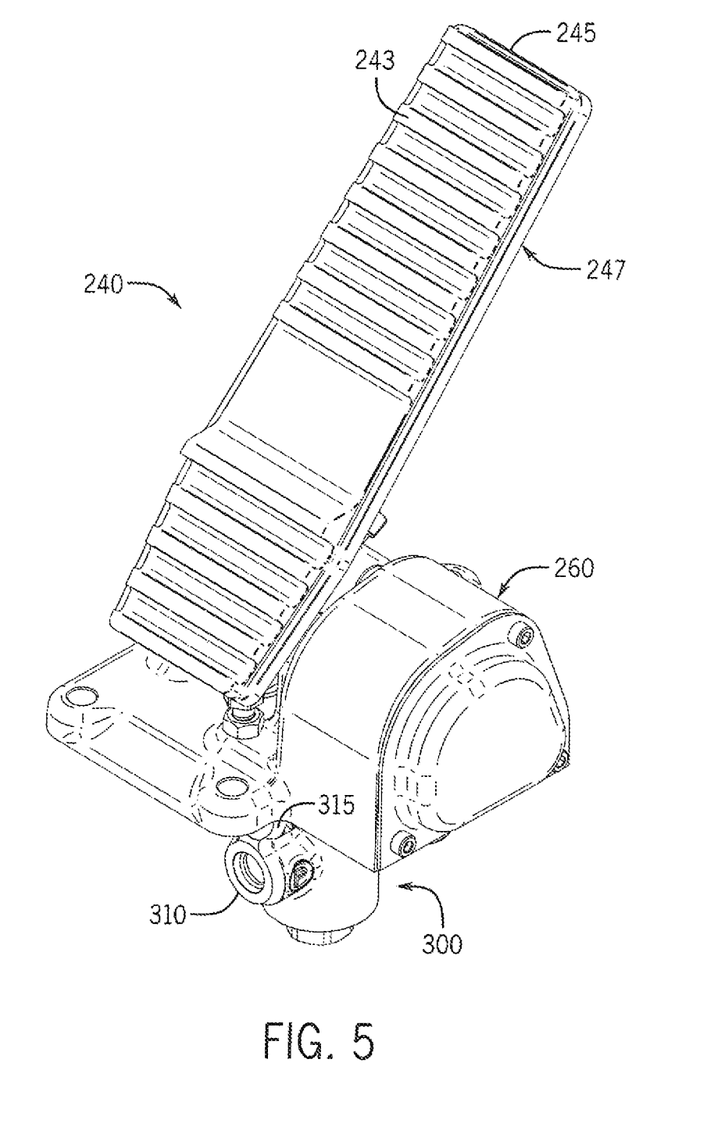
FIG. 5 is an isometric view of one embodiment of a brake pedal utilized by the hydraulic system of FIG. 4.

Referring next to FIG. 4, the hydraulic system 200 receives command signals 177, 265 from the joystick 175 and from a brake pedal 240. The joystick 175 may be moved forward and reverse to generate, for example, and analog command signal 177. The amount of deflection of the joystick 175 from a neutral position corresponds to a desired speed at which the sprayer 15 is to travel. The magnitude of the analog command signal 177 may be proportional to the amount of deflection. Optionally, a button 182 on the joystick may be pressed to indicate forward or reverse and the joystick 175 may move in a single direction from a neutral position to full deflection. It is contemplated that still other combinations of user inputs may be provided on the joystick 175 without deviating from the scope of the invention.

The operator manipulates the joystick 175 to generate a desired speed command for operation of the sprayer 15. The command signal 177 from the joystick 175 is received at the controller 173. The controller 173, in turn, generates output signals 207 to each of the hydraulic wheel motors 155. The output signals 207 may be transmitted as analog signals to control an actuator, such as a solenoid or variable position valve, on the hydraulic motor 155. Optionally, each motor 155 may be connected to the controller 173 via an industrial network and a corresponding network interface. The output signal 207 may be imbedded in a data packet transmitted via the network to the motor 155. Each hydraulic motor 155 is further connected to the hydraulic pump system 40.

According to the illustrated embodiment, the hydraulic pump system 40 includes a pair of hydraulic pumps 213 operating in tandem. Each pump 213 receives a command signal 212 from the controller 173. According to one embodiment of the invention, the command signal 212 may be an enable/disable command to start/stop the hydraulic pumps 213, and the output signal 207 to each hydraulic motor 155 controls the force applied to each wheel 45. According to another embodiment of the invention, the command signal 212 may control a rate at which the pumps 213 operate or a hydrostatic pressure output from the pumps 213, and the output signal 207 to each hydraulic motor 155 may be an enable/disable command to enable the hydraulic motor 155 to operate at the corresponding pressure. According to still another embodiment of the invention, both the command signal 212 and the output signal 207 to each hydraulic motor may be correspond to variable operation of the hydraulic pump 213 and the hydraulic motor 155, respectively. The controller 173 may generate each output signal 207 and each command signal 212 as a function of command signals from the joystick 175 and brake pedal 240 and from sensors at the pumps 213, wheels 155, or other locations corresponding to operation of the hydraulic system 200. Hydraulic lines 215 connect each pump 213 to a hydraulic distribution manifold 210, and additional hydraulic lines 217 connect the hydraulic distribution manifold 210 to each hydraulic motor 155. A pair of hydraulic lines 215, 217 is provided in each connection to establish a supply and a return line between the hydraulic components.

The operator applies pressure to the footpad 245 on the brake pedal 240 in order to slow operation of the sprayer 15. With reference also to FIGS. 5-8, the brake pedal 240 includes a footpad 245 having a front side 243 and a rear side 247. The brake pedal 240 is pivotally connected to a transducer 260 which converts the deflection of the footpad 245 into at least one electronic signal 265. The brake pedal 240 includes a rod 270 inserted between a mount 280 on one side and the transducer 260 on the opposite side of the brake pedal 240. According to one embodiment of the invention, the rod 270 may be threaded on each end with a smooth surface between the threaded portions. The rod 270 may be inserted through an opening 281 in the mount 280 and through openings in bosses 248 projecting from the rear side 247 of the footpad 245, and a first end of the rod 270 is threaded into an opening in the transducer 260. A bolt 275 may be threaded on to the other end of the rod 270 and against the mount 280 to secure the rod 270 within the brake pedal 240. The rod 270 forms the pivotal connection between the footpad 245 and the transducer 260.

Figure 6:
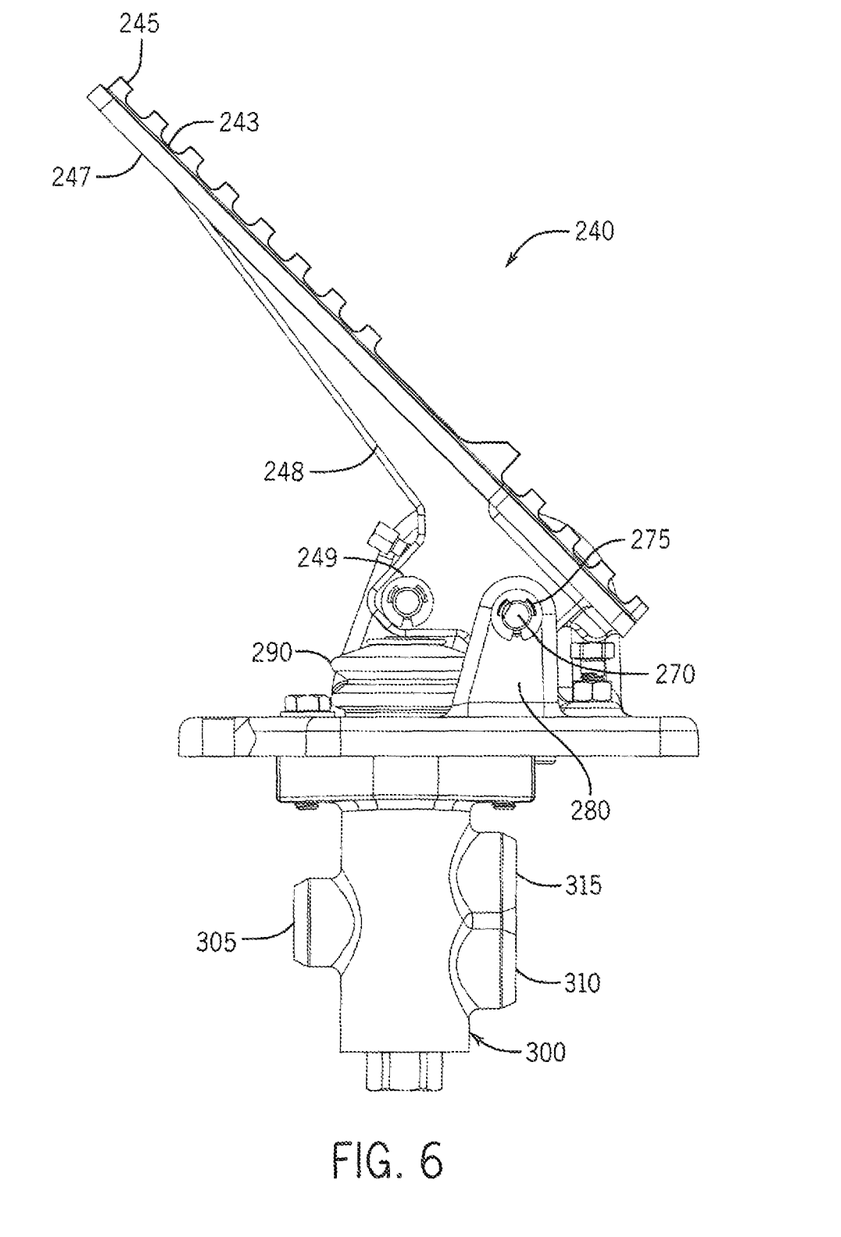
FIG. 6 is a side elevation view of the brake pedal of FIG. 5.
Figure 7:
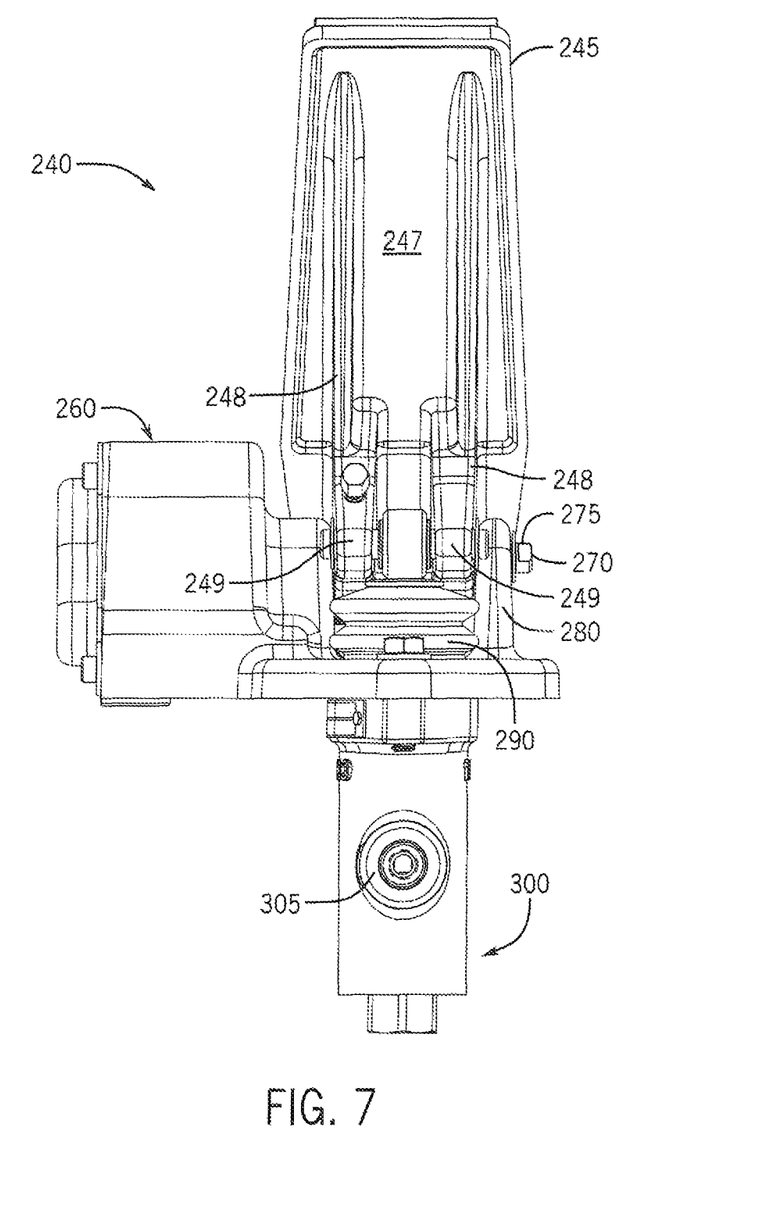
FIG. 7 is a rear elevation view of the brake pedal of FIG. 5.
Figure 8:
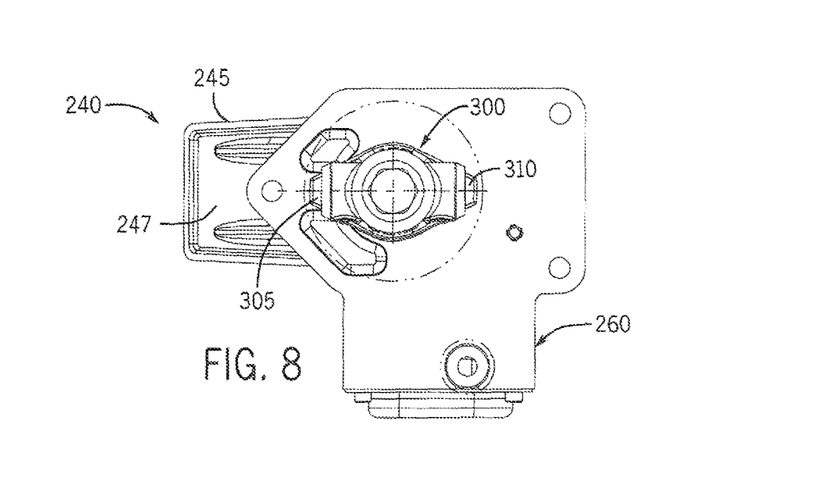
FIG. 8 is a bottom plan view of the brake pedal of FIG. 5.
Figure 9:
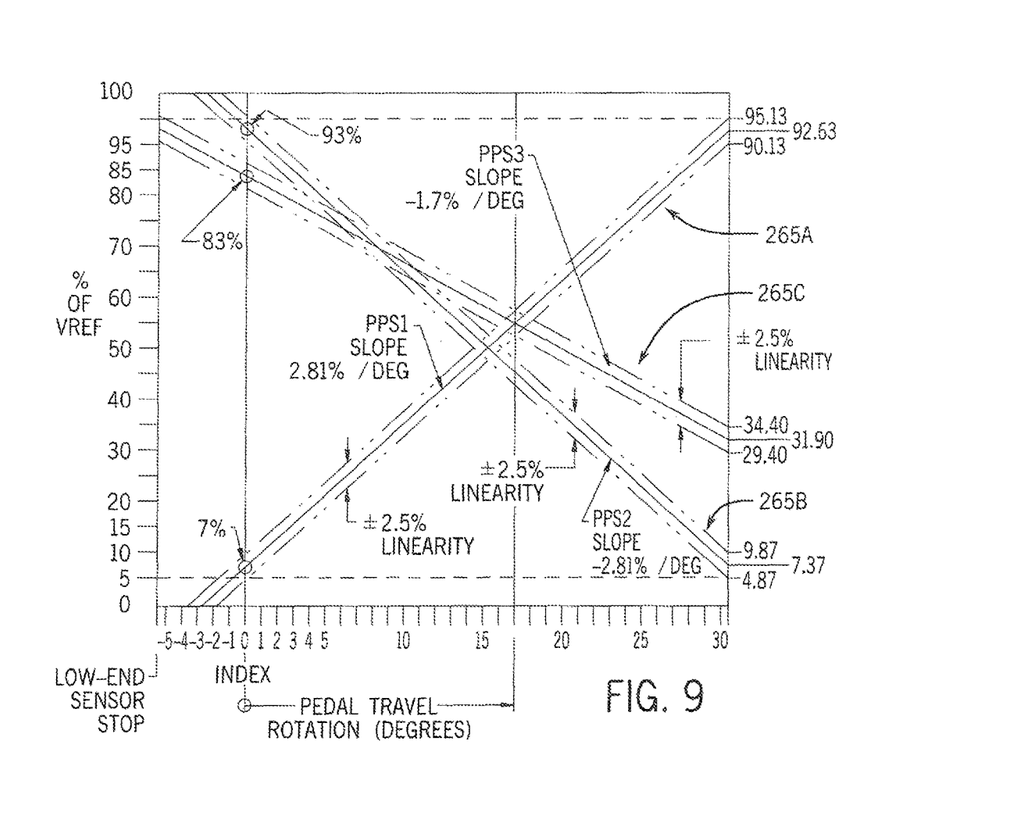
FIG. 9 is a graphical illustration of the signals output from the brake pedal of FIG. 5.

As the operator presses on the footpad 245, the transducer generates at least one signal 265 corresponding to the deflection of the footpad 245. With reference also to FIG. 9, the illustrated brake pedal 240 generates three signals 265a, 265b, and 265c corresponding to the deflection of the footpad 245. When no pressure is applied to the footpad 245, it is biased into a generally, upright neutral position, as shown in FIG. 6, also referred to as the zero degree (0°) position of travel. The footpad 245 pivotally rotates about the rod 270 over about seventeen degrees (17°) of travel. Through these seventeen degrees, each of the three signals 265a, 265b, 265c outputs a varying percentage of the reference voltage applied to the brake pedal 240. The controller 173 receives each of the signals and uses at least one of the signals to determine the amount of deflection of the footpad 245. The controller 173 may, for example, use one of the three signals 265a, 265b. 265c as a primary signal from which deflection may be determined. The other signals may be used to verify proper operation of the brake pedal 240. If the other signals indicate that the first signal has failed, the second or third signal may be utilized to determine deflection. Optionally, all three signals 265a, 265b, 265c may be converted to deflection values and an average of the three signals 265a, 265b, 265c may be used.

The brake pedal 240 further includes a pair of hydraulic actuators 249, where each hydraulic actuator 249 protrudes from the boss 248 on the rear 247 of the footpad 245. As the footpad 245 is pressed downwards, each hydraulic actuator 249 engages a plunger 290 on a hydraulic valve 300. The hydraulic valve 300 includes three ports. A brake port 305 is operatively connected to each of the service brakes 220 controlled by the brake pedal 240. A tank port 310 is operatively connected to a hydraulic tank configured to hold the hydraulic fluid in the hydraulic system 200. A pressure port 315 is operatively connected to a pressure source, such as a hydraulic pump, where the hydraulic pump draws hydraulic fluid from the hydraulic tank and supplies the hydraulic fluid to hydraulic devices at a desired pressure. When the footpad 245 is in the neutral position, the hydraulic valve 300 blocks the pressure port 315 and internally connects the brake port 305 to the tank port 310, allowing hydraulic fluid to be released from the service brakes 220. At an intermediate position, the hydraulic valve 300 blocks all three ports in a transitional operating mode. As the footpad 245 approaches full deflection, the tank port 310 is blocked and the pressure port 315 is connected to the brake port 305, supplying hydraulic fluid to the service brakes 220 to cause actuation of the service brakes 220. According to the illustrated embodiment, each service brake 220 includes a rotor 225, mechanically coupled to one of the wheels 45, and a caliper 230 with brake pads to engage the rotor 225. When hydraulic fluid is supplied to the service brake 220, the caliper closes. As the pressure of the hydraulic fluid increases, the caliper closes with increased force, which causes the brake pads to engage the rotor 225 with greater force and, therefore, with greater stopping power.

In operation, the motion of a sprayer 15 is controlled by an operator selectively manipulating the joystick 175 and selectively depressing the brake pedal 240 in the cab 30 of the sprayer 15. When the brake pedal 240 is not being pressed, it is biased back to a neutral position and the signal 265 from the brake pedal 240 indicates no deflection. When there is no deflection of the brake pedal 240, the controller 173 controls the rate of travel of the sprayer 15 responsive to the command signal 177 from the joystick 175. The command signal 177 may be, for example, zero volts at a neutral position and move between a positive and negative voltage reference responsive to full deflection in the forward and reverse directions. Optionally, the neutral position may be equal to one half of the reference voltage, and the command signal 177 may range between zero volts and the reference voltage responsive to full deflection in the forward and reverse directions. The controller 173 generates the output signals 207 to each hydraulic motor 155 and the command signal 212 to the hydraulic pump system 40 responsive to the command signal 177 from the joystick. The controller 173 may operate either in an open loop manner, without speed feedback, or in a closed loop manner, receiving a speed feedback signal to vary the output signals 207 and the command signal 212 to maintain the desired speed of travel as indicated by the joystick 175.

If the operator needs to slow the sprayer 15, the joystick 175 may be moved closer to the neutral position and thereby slow the commanded speed of travel. The hydraulic system 200 will adjust the speed of travel. Similarly, if the operator wishes to increase the speed of the sprayer 15, the joystick 175 may be moved further from the neutral position.

However, it takes a period of time for the hydraulic system 200 to adjust the speed of travel. Further, if the joystick 175 is simply moved to a neutral position, no command is provided and the sprayer 15 may begin rolling as a result of gravity and of the inclination of the surface on which the sprayer 15 is located. Under operating conditions in which it is desirable to slow quickly or to maintain a stopped condition, the operator depresses the brake pedal 240.

Although the joystick 175 may be moved back to neutral prior to pressing the brake pedal 240, emergency or sudden braking may cause the operator to press the brake pedal 240 while the joystick 175 is still providing a command signal 177. Under these conditions, the controller receives both the command signal 177 from the joystick 175 and an output signal 265 from the transducer 260 on the brake pedal 240. The controller 173 may first determine a desired speed according to the command signal 177. The controller 173 then reduces the desired speed responsive to the output signal 265 from the brake pedal 240. According to one embodiment of the invention, as the deflection of the brake pedal 240 moves from about 2% of total deflection to about 65% of total deflection, the controller 173 reduces the desired speed from commanded speed to zero speed. The reduction may occur in a linear manner, or in a gradually increasing (e.g., hyperbolic) manner across the range of deflections. Once the brake pedal 240 reaches 65% deflection, the controller 173 commands the hydraulic pumps 213 and hydraulic motors 155 to run at zero speed and further sets an internal interlock to prevent further speed commands from being issued until the interlock is released. The interlock is released upon moving the joystick 175 back to a neutral position. According to the illustrated embodiment, the brake pedal 240 has about seventeen degrees of deflection. Thus, two percent deflection is about one-third of one degree and sixty-five percent deflection is about eleven degrees. It is understood, that various other ranges of deflection and threshold levels may be utilized without deviating from the scope of the invention.

Figure 10:
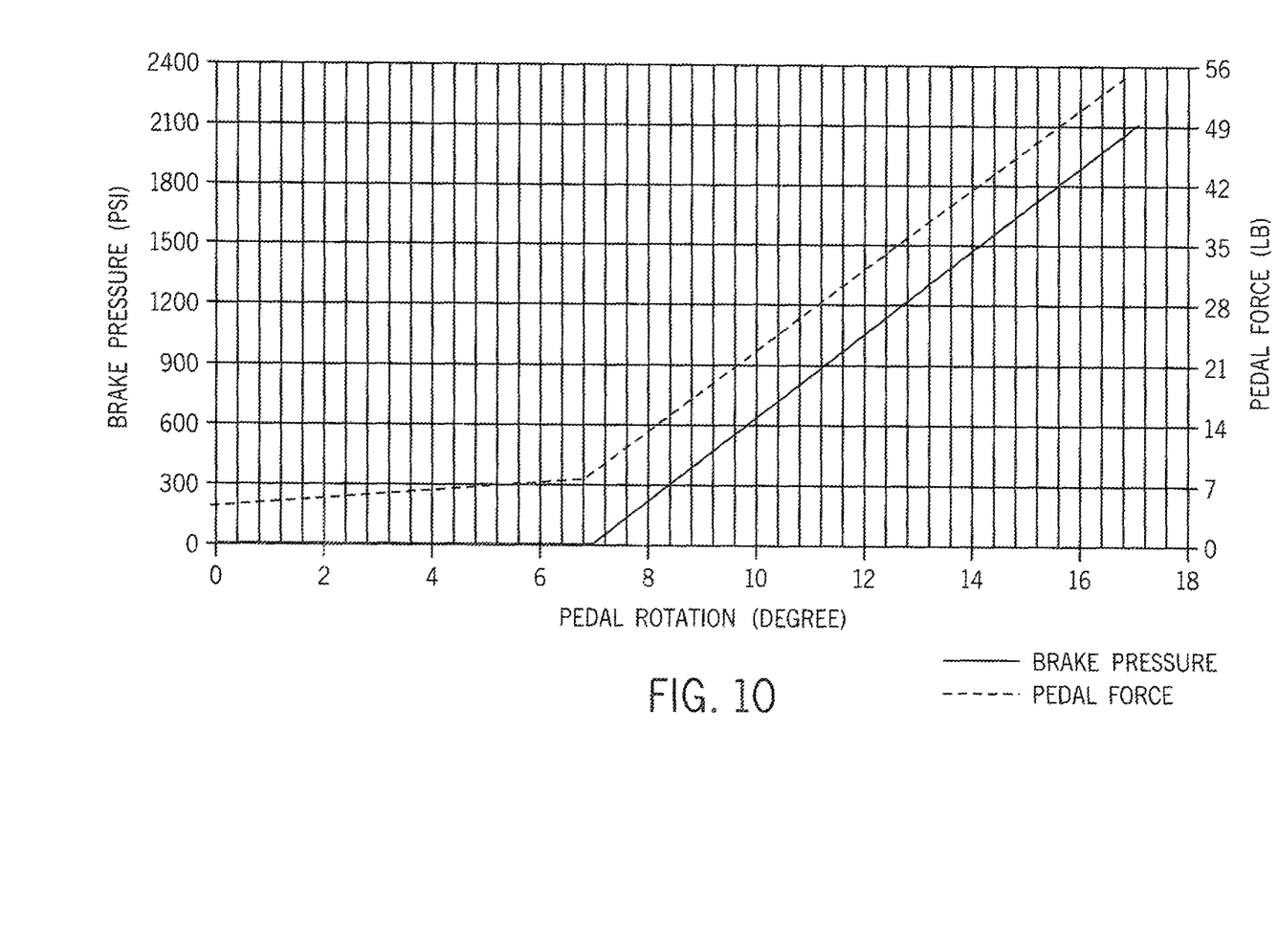
FIG. 10 is a graphical illustration of the performance characteristics of the brake pedal of FIG. 5.

With reference also to FIG. 10, exemplary performance of the brake pedal 240 is illustrated. During the initial deflection, the hydraulic actuators 249 move the hydraulic valve 300 from the unbiased position to the intermediate position. At about seven degrees of deflection, the hydraulic valve 300 begins to allow flow between the pressure port 315 and the brake port 305. Between seven degrees and seventeen degrees (i.e., full deflection) the hydraulic valve 300 allows an increasing amount of hydraulic fluid to flow between the pressure port 315 and the brake port 305, thereby increasing the pressure applied by the service brakes. At seven degrees of deflection, the controller 173 has reduced any speed command from the joystick 175 by about two-thirds. As a result, when the brake pedal 240 begins increasing the pressure applied to the service brakes 220, the command to the hydraulic motors 155 has already been significantly reduced. As the brake pedal 240 is pressed down further, the controller 173 reduces any command from the joystick 175 to zero when the brake pedal 240 is applying about forty percent of rated force to the service brakes 220. As a result of providing the signal 265 from the transducer 260 to the controller 173, the controller 173 may reduce the number of instances and the amount of competing forces being applied when both the hydraulic motor 155 and service brakes 220 are commanded in tandem.

As discussed above, the illustrated brake pedal 240 includes three modes of operation. The three modes exist along three segments of the total deflection of the brake pedal 240. A first segment exists between about one-third of one degree and seven degrees. During this initial segment, the controller 173 is reducing the desired speed command, generated by the joystick 175, as a function of the deflection of the brake pedal without applying pressure to the service brakes 220. As the brake pedal moves from one-third of one degree to seven degrees, the amount the desired speed command is reduced increases. A second segment exists from about seven degrees to about eleven degrees. During this second segment, further deflection of the brake pedal causes the desired speed command to reduce to a zero speed command. During the second segment, the hydraulic valve 300 on the brake pedal also applies increasing pressure to the service brakes 220 corresponding to the amount of deflection between seven and eleven degrees. The third segment exists from about eleven degrees to about seventeen degrees. The speed command is held at zero and the force applied to the service brakes continues to increase up to a full braking force.

As a result of the three segments of operation, the brake pedal 175, in cooperation with the controller 173, begin to ramp down the speed command to the hydrostatic drive prior to application of the service brakes 220 when the joystick is still generating a speed command. The brake pedal may then begin applying the service brakes with a reduced speed command. As further deflection of the brake pedal occurs, the speed command is ramped down to zero and reaches zero prior to application of the full braking force with the service brakes. During the final segment, the braking force applied by the service brakes 220 is increased to full braking force without having a counteracting speed command present. The coordinated decrease in the speed command in combination with the increase in the braking force reduces wear on the service brakes during a sudden braking event while a speed command is being generated.

Many changes and modifications could be made to the invention without departing from the spirit thereof. The scope of these changes will become apparent from the appended claims.

We claim:

1. A system for stopping an agricultural vehicle, comprising:
a first user interface operable to provide a first command signal corresponding to a desired travelling speed of the agricultural vehicle;
a second user interface operable to generate a second command signal corresponding to a desired braking of the agricultural vehicle; and
a controller configured to receive each of the first and the second command signals and to generate a third command signal to a hydrostatic drive unit for the agricultural vehicle as a function of the first and second command signals;
wherein:
the controller generates an interlock disabling the hydrostatic rive unit when the first command signal indicates the first user interface is not a neutral position and the second command signal exceeds a predefined threshold; and
the controller releases the interlock when the first command signal indicates the first user interface is at the neutral position.

2. The system of claim 1 wherein the first user interface is a joystick and wherein the first command signal has a range between zero speed and full speed corresponding to a range of deflection of the joystick.

3. The system of claim 2 wherein the second user interface is a brake pedal having a transducer, wherein the transducer generates the second command signal corresponding to a range of deflection of the brake pedal.

4. The system of claim 3 wherein the third command signal to the hydrostatic drive unit corresponds to the first command signal when the brake pedal is at a neutral position and the third command signal to the hydrostatic drive unit is reduced from the first command signal by the second command signal as the brake pedal travels through the range of deflection of the brake pedal.

5. A system for stopping an agricultural vehicle, comprising;
 a first interface operable to provide a first command signal corresponding to a desired travelling speed of the agricultural vehicle;
 a second user interface operable to generate a second command signal corresponding to a desired braking of the agricultural vehicle; and
 a controller configured to receive each of the first and the second command signals and to generate a third command signal to a hydrostatic drive unit for the agricultural vehicle as a function of the first and second command signal;
wherein:
 the first user interface is a joystick and wherein the first command signal has a range between zero speed and full speed corresponding to a range of deflection of the joystick;
 the second interface is a brake pedal having a transducer, wherein the transducer generates the second command signal corresponding to a range of deflection of the brake pedal; and
 the controller generates an interlock disabling the hydrostatic drive unit when the first command signal indicates the joystick is not at a neutral position and the second command signal exceeds a predefined threshold and wherein the controller releases the interlock when the first command signal indicates the joystick is at the neutral position.

6. The system of claim 3 wherein the system further comprises a set of service brakes and wherein the range of deflection of the brake pedal generates a fourth command signal to control operation of the service brakes to slow the agricultural vehicle.

7. A system for stopping an agricultural vehicle, comprising:
 a joystick operable to provide a first command signal corresponding to a desired travelling speed of the agricultural vehicle;
 a brake pedal, including a transducer operable to generate a second command signal corresponding to a range of deflection of the brake pedal; and
 a controller configured to receive each of the first and the second command signals and to generate a third command signal to a hydrostatic drive unit for the agricultural vehicle as a function of the first and second command signals
wherein:
 the controller generates am interlock disabling the hydrostatic drive unit when the first command signal indicates the joystick is not at a neutral position and the second command signal exceeds a predefined threshold; and
 the controller releases the interlock when the first command signal indicates the joystick is at the neutral position.

8. The system of claim 7 wherein the first command signal has a range between zero speed and full speed corresponding to a range of deflection of the joystick and wherein the third command signal corresponds to the first command signal when the brake pedal is in a neutral position.

9. The system of claim 8, wherein the third command signal is reduced by the second command signal corresponding to the range of deflection of the brake pedal.

10. A system for stopping an agricultural vehicle, comprising;
 a joystick operable to provide a first command signal corresponding to a desired travel speed of the agricultural vehicle;
 a brake pedal, including a transducer operable to generate a second command signal corresponding to a range of deflection of the brake pedal:, and
 a controller configured to receive each of the first and the second command signals and to generate a third command signal to a hydrostatic drive unit for the agricultural vehicle as a function of the first and second command signals;
wherein:
 the first command signal has a range between zero speed and full speed corresponding to a range of the joystick;
 the third command signal corresponds to the first command signal when the brake pedal is in a neutral position;
 the joystick includes a neutral position; and
 the controller sets an interlock on motion of the agricultural vehicle when the deflection of the brake pedal exceeds a predefined threshold and the joystick is not in the neutral position and the controller resets the interlock when the joystick returns to the neutral position.

11. The system of claim 10 wherein the system further comprises a set of service brakes and wherein the range of deflection of the brake pedal generates a fourth command signal to control operation of the set of service brakes to slow the agricultural vehicle.

12. The system of claim 11 wherein:
 the range of deflection of the brake pedal includes a first segment, a second segment, and a third segment;
 during the first segment, the third command signal is reduced to a predefined, non-zero level without generating the fourth command signal;
 during the second segment, the third command signal is reduced to zero and the fourth command signal is generated to a level less than a full braking force; and
 during the third segment, the fourth command signal is increased to the full braking force.

13. A method for controlling a speed of travel of an agricultural vehicle, comprising the steps of:
 generating a first command signal with a first user interface, wherein the first command signal corresponds to a desired speed of travel of the agricultural vehicle;
 generating a second command signal with a second user interface, wherein the second command signal corresponds to a desired braking of the agricultural vehicle;
 receiving the first command signal and the second command signal at a controller on the agricultural vehicle;
 generating a third command signal with the controller responsive to both the first command signal and the second command signal; and
 transmitting the third command signal to a hydrostatic drive unit for the agricultural vehicle, Wherein the hydrostatic drive unit supplies hydraulic fluid to a plurality of hydraulic motors on the agricultural vehicle responsive to the third command signal, the plurality of hydraulic motors controlling the speed of travel of the agricultural vehicle;
wherein:
 the controller generates an interlock disabling the hydrostatic drive unit when the first command signal indicates the first user interface is not at a neutral position and the second command signal exceeds a predefined threshold; and the controller releases the interlock when the first command signal indicates the first user interface is at the neutral position.

14. The method of claim 13 wherein the first user interface is a joystick and the first command signal has a range between zero speed and full speed corresponding to a range of deflection on the joystick.

15. The method of claim 14 wherein the second user interface is a brake pedal and the second command signal corresponds to a range of deflection of the brake pedal.

16. The method of claim 15 wherein the step of generating a first command signal is initially performed with the second user interface in a neutral position indicating no desired braking of the agricultural vehicle and wherein the third command signal corresponds to the first command signal.

17. The method of claim 16 wherein each of the hydraulic motors controls operation of one wheel of the agricultural vehicle and the wheel includes a service brake operable to slow rotation of the wheel.

18. A method for controlling a speed of travel of an agricultural vehicle, comprising the steps of:

generating a first command signal with a first user interface, wherein the first command signal corresponds to a desired speed of travel of the agricultural vehicle;

generating a second command signal with a second user interface, wherein the second command signal corresponds to a desired braking of the agricultural vehicle;

receiving the first command signal and the second command signal at a controller on the agricultural vehicle;

generating a third command signal with the controller responsive to both the first command signal and the second command signal; and transmitting the third command signal to a hydrostatic drive unit for the agricultural vehicle, wherein the hydrostatic drive unit supplies hydraulic fluid to a plurality of hydraulic motors on the agricultural vehicle responsive to the third command signal, the plurality of hydraulic motors controlling the speed of travel of the agricultural vehicle;

wherein:

the first user interface is a joystick and the first command signal has a range between zero speed and full speed corresponding to a range of deflection on the joystick;

the second user interface is a brake pedal and the second command signal corresponds to a range of deflection of the brake pedal;

the step of generating a first command signal is initially performed with the second user interface in a neutral position indicating no desire braking of the agricultural vehicle and wherein the third command signal corresponds to the first command signal;

each of the hydraulic motors controls operation of one wheel of the agricultural vehicle and the wheel includes a service brake operable to slow rotation of the wheel; and the step of generating the second command signal further includes the steps of:

moving the brake pedal from the neutral position through the range of deflection of the brake pedal, wherein the range of deflection includes a first segment, a second segment, and a third segment;

during the first segment, reducing the third command signal to a predefined, non-zero level without generating a fourth command signal to the service brake;

during the second segment, reducing the third command signal to zero and increasing the fourth command signal to a level less than a full braking force; and during the third segment, increasing the fourth command signal to the full braking force.

19. The method of claim 18 further comprising the step of setting an interlock to disable the hydrostatic drive unit when the deflection of the brake pedal exceeds a predefined threshold and the joystick is in a non-neutral position.

20. The method of claim 19 further comprising the step of resetting the interlock in the controller when the joystick returns to a neutral position.

* * * * *